United States Patent
Drozdenko et al.

(10) Patent No.: US 6,347,715 B1
(45) Date of Patent: Feb. 19, 2002

(54) PATCH PANEL ASSEMBLY

(75) Inventors: Lee M. Drozdenko, Middletown; Steven O. Fournier, Southington, both of CT (US); Robert C. Baxter, Warwick, RI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/668,366

(22) Filed: Sep. 25, 2000

(51) Int. Cl.[7] .............................. A47F 5/00; H01R 13/60
(52) U.S. Cl. ...................................... 211/26; 439/540.1
(58) Field of Search ................ 211/26, 189; 312/265.1, 312/265.2, 265.3, 265.4, 265.5; 361/829; 439/540.1

(56) References Cited

U.S. PATENT DOCUMENTS

| | | | |
|---|---|---|---|
| 4,712,232 A | * | 12/1987 | Rodgers |
| 4,878,847 A | * | 11/1989 | Rutledge |
| 5,129,842 A | * | 7/1992 | Morgan et al. |
| 5,145,380 A | * | 9/1992 | Holcomb et al. |
| 5,412,751 A | * | 5/1995 | Siemon et al. |
| 5,575,665 A | * | 11/1996 | Shramawick et al. |
| 5,647,763 A | * | 7/1997 | Arnold et al. ........... 439/540.1 |
| 5,765,698 A | | 6/1998 | Bullivant |
| 5,788,087 A | * | 8/1998 | Orlando ........................ 211/26 |
| 5,836,551 A | * | 11/1998 | Orlando |
| 6,077,113 A | * | 6/2000 | Lecomte .................. 439/540.1 |
| 6,080,011 A | * | 6/2000 | Tsao et al. ........... 439/540.1 X |
| 6,086,415 A | * | 7/2000 | Sanchez et al. .......... 439/540.1 |

OTHER PUBLICATIONS

Hubbell Premise Wiring Catalog, prior to Dec., 1999, pp. 1, 58–70, 76–81, 84–85, 90–92, 96–98, 106–107.

* cited by examiner

*Primary Examiner*—Robert W. Gibson, Jr.
(74) *Attorney, Agent, or Firm*—Tara L. Hoffman; Mark S. Bicks; Alfred N. Goodman

(57) ABSTRACT

A patch panel assembly includes a panel that has opposing first and second end portions with a plurality of panel securing apertures located on each end portion. A cable management bar is releasably coupled to the panel and has opposing first and second arm portions with tab securing elements extending therefrom that correspond to and engage the panel securing apertures. First and second cover members are coupled to the panel at each of the first and second end portions. Each of the first and second cover members cover the tab securing elements of the cable management bar when coupled with the panel. Slots for holding identification labels are also disposed in the outer surfaces of the first and second cover members.

31 Claims, 3 Drawing Sheets

PATCH PANEL ASSEMBLY

BACKGROUND OF THE INVENTION

Cross-connect products, such as a patch panel assembly, are employed to distribute and manage cable wiring. Commonly, the cross connect product is mounted on a cable management relay rack that is usually located in a termination closet and requires rear access. Conventional cross-connect products typically include a plurality of rear electrical terminals and a plurality of front electrical jacks for connection to a variety of wires.

Typically, multiple wires are connected to the rear of the patch panel, and thus a cable management bar is often required to support the wires and relieve stress on the terminals. Commonly, the management bar is bolted to the patch panel, thus requiring the use of multiple fasteners. The fasteners also fixedly attach the bar to the panel, thereby preventing easy removal of the bar when access to the patch panel is desired.

In addition, multiple patch panel assemblies are usually mounted to one rack. As such, it is often necessary to use an identification label with each patch panel, as well as some of the individual terminals. Typically, an adhesive label with informational indicia thereon is applied to the panel. However, such labels are not easily replaced or removed.

Some examples of prior art patch panel assemblies are disclosed in U.S. Pat. Nos.: 4,845,316 to Kaercher; 5,401,193 to Lo Cicero et al.; 5,668,910 to Arnett; 5,731,546 to Miles et al.; 5,836,786 to Pepe; and 6,053,764 to Curry et al.

SUMMARY OF THE INVENTION

Accordingly, an object of the present invention is to provide a patch panel assembly having a cable management bar connected to the patch panel without the use fasteners.

Another object of the present invention is to provide a patch panel assembly having a cable management bar that is easily removable from the patch panel.

A further object of the present invention is to provide a patch panel assembly with label covers that hold and display labels for identifying the patch panel and terminals thereof.

A yet further object of the present invention is to provide a patch panel assembly with label covers that releasably hold labels so that they are easily replaceable.

A still further object of the present invention is to provide a patch panel assembly with label covers that cosmetically cover the attachment of the cable management bar and the patch panel.

The foregoing objects are basically attained by a patch panel assembly, comprising, a panel having a main wall portion, opposing first and second surfaces, opposing first and second end portions with first and second panel securing apertures, respectively, and a first length defined between the first and second end portions, the first and second panel securing apertures extending from the first surface to the second surface; and a support member releasably coupled to the panel and having a main portion, first and second arm portions extending from opposing ends of the main portion, and a second length defined between the opposing ends of the main portion, the second length being substantially equal to the first length of the panel, and the first and second arm portions including first and second support securing elements extending therefrom, respectively, the first and second support securing elements being received in and extending through the first and second panel securing apertures of the panel, respectively.

The foregoing objects are also basically attained by a patch panel assembly, comprising, a panel having a main wall portion, opposing first and second surfaces, opposing first and second end portions with first and second panel securing elements, respectively; a support member releasably coupled to the panel and having a main portion, and first and second arm portions extending from opposing ends of the main portion, with first and second support securing elements extending therefrom, respectively, the first and second support securing elements being engaged with the first and second panel securing elements of the panel, respectively; and a first cover member coupled to the panel at the first end portion, the first cover member having opposing inner and outer surfaces, the inner surface substantially covering both the first panel securing element and the first support securing element.

By structuring the patch panel assembly in this manner, the cable management bar can be easily secured to the patch panel without the use of fasteners. In addition, identification labels can be easily applied to the patch panel and replaced when desired. Moreover, the label covers of the assembly provide a cosmetic cover of the panel and the cable management bar securing elements.

Other objects, advantages and salient features of the invention will become apparent from the following detailed description which taken in conjunction with annexed drawings, discloses the preferred embodiment of the present invention.

BRIEF DESCRIPTION OF THE DRAWINGS

Referring to the drawings which form a part of this disclosure.

DETAILED DESCRIPTION OF THE INVENTION

Figure 1:
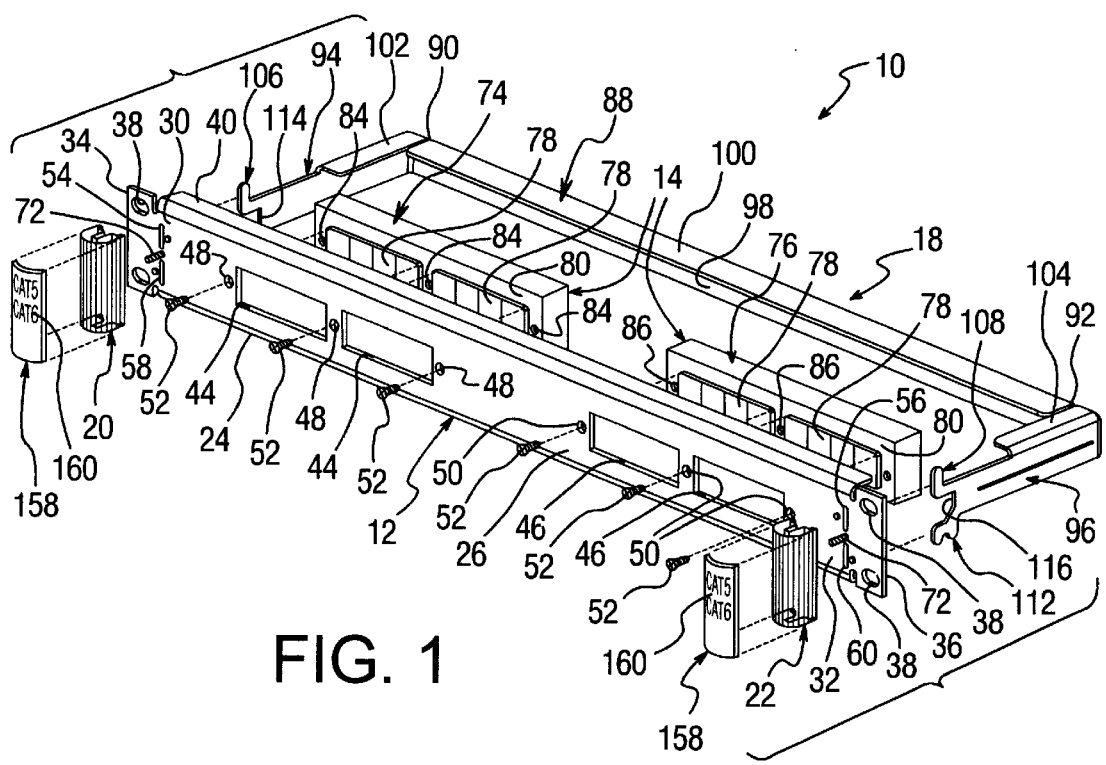
FIG. 1 is a front, top, exploded perspective view of a patch panel assembly according to an embodiment of the present invention, illustrating the assembly of a patch panel, an adapter assembly, a cable management bar, label covers, and labels.

Referring to FIGS. 1–9, a patch panel assembly 10 according to the present invention comprises a patch panel 12 having an adapter assembly 14 mounted thereon with a plurality of wires 16 electrically connected to adapter assembly 14, a cable management bar 18 coupled to patch panel 12 for supporting wires 16, and label covers 20 and 22 applied to patch panel 12 providing a mechanism for identifying patch panel assembly 10.

Patch panel 12 includes a main wall portion 24 with a front or first substantially planar surface 26 and a rear or second substantially planar surface 28, a first end portion 30, and a second end portion 32 opposing first end portion 30 where a length of panel 12 is defined between first and second end portions 30 and 32. Patch panel 12 is preferably formed of a metal material. Each end portion 30 and 32 includes first and second attachment flanges 34 and 36 extending outwardly therefrom in the same plane as main wall portion 24, as best seen in FIG. 1. First and second attachment flanges 34 and 36 each have a plurality of holes 38 for attachment to a cable management relay rack (not shown), as is well known in the art.

Figure 2:
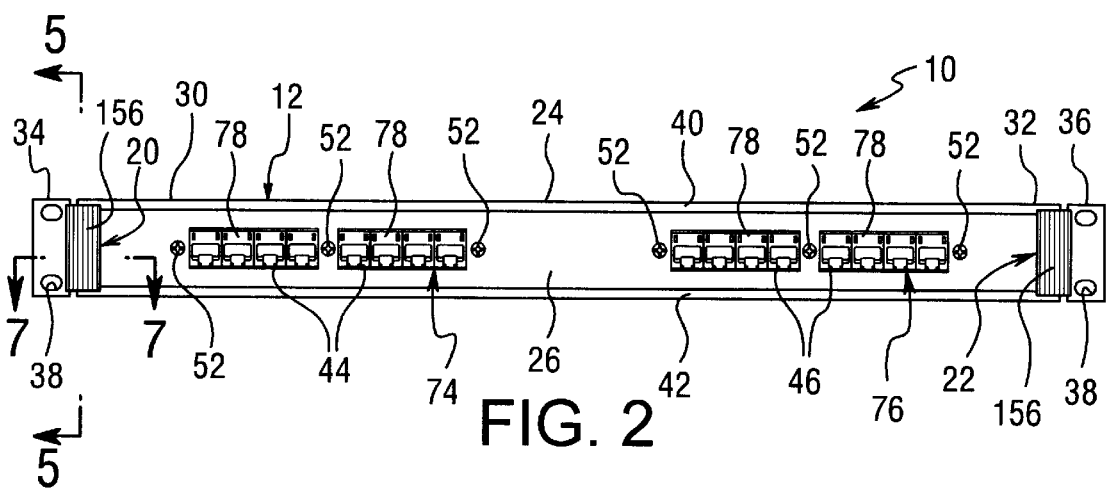
FIG. 2 is front elevational view of the patch panel assembly illustrated in FIG. 1, showing the assembled patch panel assembly.

Upper and lower flanges 40 and 42 extend from the top and bottom of main wall portion 24, respectively, and define a receiving area therebetween for receiving adapter assembly 14. Both upper and lower flanges 40 and 42 extend rearwardly such that they are substantially planar to rear surface 28. A first pair of openings 44 are disposed in main wall portion 24 near first end portion 30 and a second pair of openings 46 are disposed near second end portion 32. The openings 44 and 46 are shaped to receive a portion of adapter assembly 14, as best seen in FIG. 2. Although openings 44 and 46 are shown as generally rectangular, the openings 44 and 46 can be any shape as long as they can accommodate adapter assembly 14.

A first set of smaller fastener holes 48 are disposed near first pair of openings 44 such that one fastener hole is disposed between openings 44 and the remaining two fastener holes are disposed at either end of the openings 44. Similarly, a second set of fastener holes 50 are disposed near second pair of openings 46 in the same fashion as described above with respect to first set of fastener holes 48. The fastener holes 48 and 50 each received a fastener 52 for mounting adapter assembly 14 to the rear surface 28 of panel 12.

First and second end portions 30 and 32 include first, second, third, and fourth panel securing elements or apertures 54, 56, 58, and 60 for receiving cable management bar 18. In particular, first and third securing apertures 54 and 58 are disposed as a pair in first end portion 30 and second and fourth securing apertures 56 and 60 are disposed as a pair in second end 32, as best seen in FIG. 1.

Each of the apertures 54, 56, 58, and 60 is formed as a narrow generally rectangular vertical slot. First securing aperture 54 is aligned with and located above third securing aperture 58 at first end 30. Similarly, second securing aperture 54 is aligned with and located above fourth securing aperture 58 at second end 32. Although apertures 54, 56, 58, and 60 are preferably substantially rectangular and narrow, the apertures can be of any shape as long as they can receive securing elements of cable management bar 18 such that bar 18 is securable to panel 12. First and second securing apertures 54 and 56 include top and bottom surfaces 62 and 64. Similarly, third and fourth securing apertures 58 and 60 include top and bottom surfaces 66 and 68. A mounting hole 70 is disposed between both first and third securing apertures 54 and 58 and second and fourth securing apertures 56 and 60 for receiving a mounting fastener 72 that engages first and second label covers 20 and 22, as seen in FIG. 1.

Figure 3:
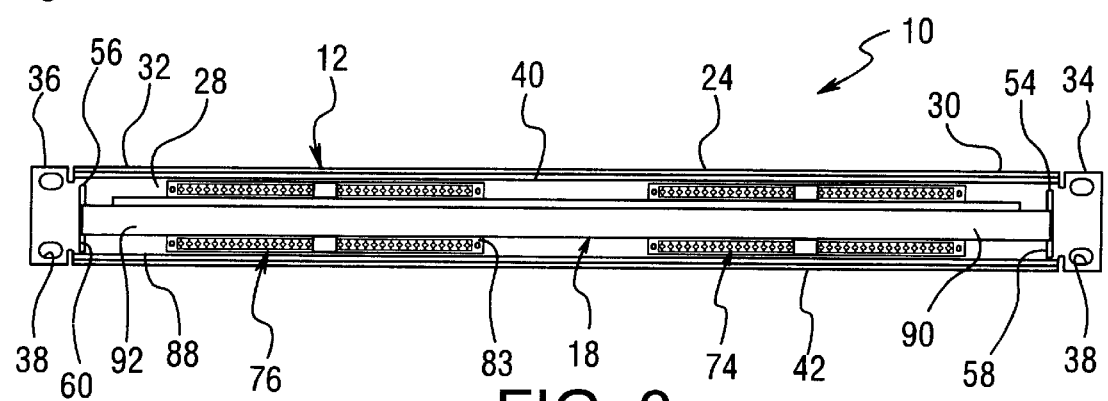
FIG. 3 is a rear elevational view of the patch panel assembly illustrated in FIG. 1, showing the assembled patch panel assembly.

Adapter assembly 14 is mounted to the rear surface 28 of panel 12, as best seen in FIG. 3. Adapter assembly 14 particularly includes first and second parts 74 and 76 where each part 74 and 76 has a plurality of electrical connection jacks 78 on their front surface 80 and a plurality of electrical terminals 82 on their rear surface 83 that corresponds to the jacks 78 on the front surface 80, as is well known in the art. Wires 16 are attached to terminals 82 and are generally not removed while other wires can be plugged into and removed from jacks 78. Front surface 80 also includes first and second groups of fastener holes 84 and 86 that correspond to first and second sets of fastener holes 48 and 50, respectively, on panel 12 and receive fasteners 52 to mount adapter assembly 14 on panel 12.

Figure 4:
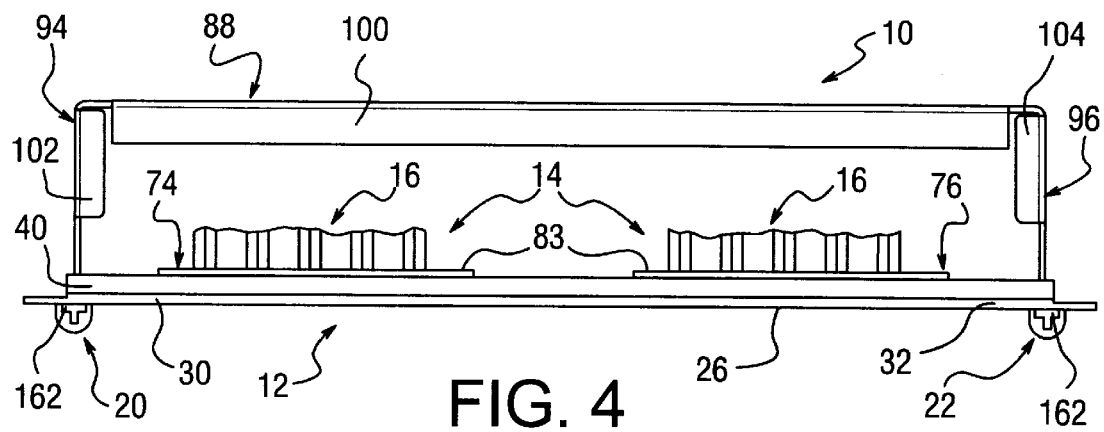
FIG. 4 is a top plan view of the patch panel assembly illustrated in FIG. 1, showing the assembled patch panel assembly and a plurality of wires connected thereto.

Cable management bar or support member 18 is also attached to the rear of panel 14, as best seen in FIGS. 3 and 4, and is preferably formed of a metal material. Cable management bar 18 specifically includes a main portion 88 with first and second ends 90 and 92 that generally correspond to first and second end portions 30 and 32 of panel 12, respectively, and first and second arm portions 94 and 96 extend from first and second ends 90 and 92, respectively. First and second ends 90 and 92 further define a length of the management bar 18, where the length of bar 18 is substantially equal to the length of panel 12. In particular, first and second arm portions 94 and 96 extend generally perpendicularly from main portion 88 forming a substantially C-shaped management bar 18. Each of main portion 88, and first and second arm portions 94 and 96, are substantially planar and form an inner perimeter 98 that is spaced from and surrounds adapter assembly 14.

Main portion 88 further includes an upper support flange 100 extending from the top thereof such that it is generally perpendicular to main portion 88. Similarly, first and second arm portions 94 and 96 each include support flanges 102 and 104 extending from the tops of and substantially perpendicularly to arm portions 94 and 96, respectively. Flanges 100, 102 and 104 provide a surface for supporting wires 16 thereon. Wire tiebacks (not shown) can alternatively be included on flange 100 to facilitate management of those wires.

Each of first and second arm portions 94 and 96 include first, second, third, and fourth support securing elements or tabs 106, 108, 110, and 112 disposed at their distal ends that correspond and connect to first, second, third, and fourth securing apertures 54, 56, 58, and 60 of panel 12, respectively. A tab is defined as a projection or a tongue. First and third securing tabs 106 and 110 extend from the end 114 of first arm portion 94 and second and fourth securing tabs 108 and 112 extend from the end 116 of second arm portion 96.

Figure 5:
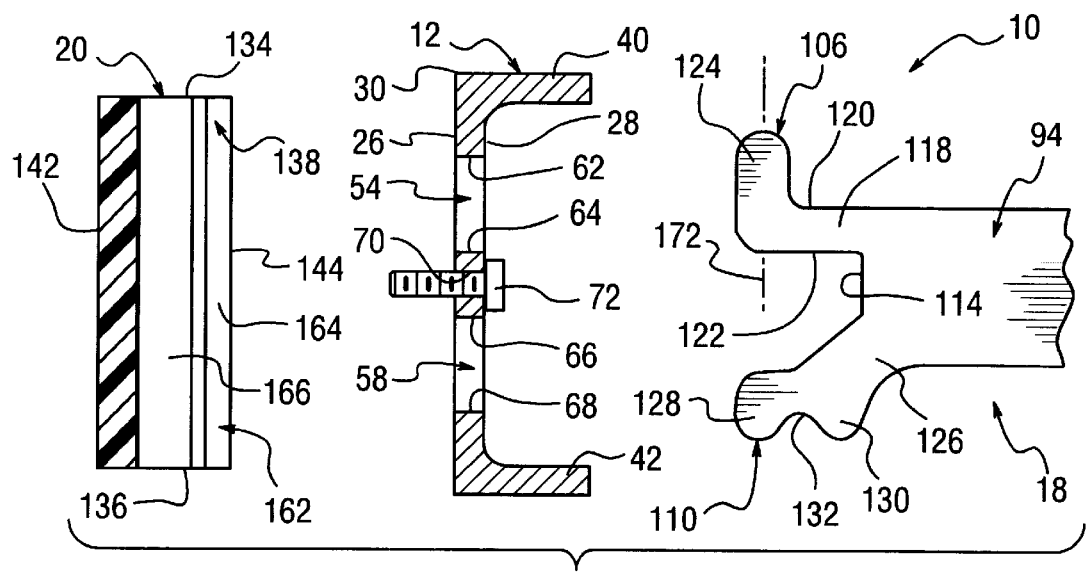
FIG. 5 is an enlarged, exploded, side view in section of the patch panel assembly taken along line 5—5 of FIG. 2, showing the assembly of the label cover, the patch panel, and the cable management bar.
Figure 6:
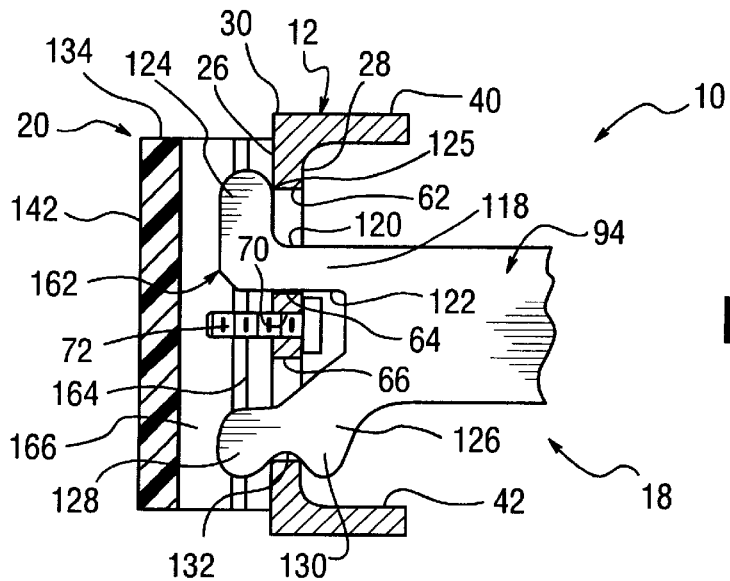
FIG. 6 is an enlarged, side view in section of the patch panel assembly illustrated in FIG. 5, showing the label cover, the patch panel, and the cable management bar assembled.

First and second securing tabs 106 and 108 are substantially identical and therefore the same reference numerals will be employed to describe both. Each of tabs 106 and 108 particularly includes a first or extension section 118 that is planar with and connected to the ends 114 and 116 of first and second arm portions 94 and 96, respectively, such that extension section 118 is substantially perpendicular to ends 114 and 116. Extension section 118 includes upper and lower surfaces 120 and 122 with a second or upstanding section 124 extending upwardly from upper surface 120 of extension section 118 such that upstanding section 124 is substantially perpendicular to extension 118 thereby forming a generally L-shaped tab, as best seen in FIGS. 5 and 6.

Third and fourth securing tabs 110 and 112 are substantially identical and therefore the same reference numerals will be employed to describe both. Similar to first and second securing tabs 106 and 108, each of third and fourth securing tabs 110 and 112 includes an extension section 126 that extends from ends 114 and 116 of first and second arm portions 94 and 96, respectively. Extension section 126 is also planar to first and second arm portions 94 and 96, and is spaced from and vertically aligned with extension section 118 of first and second tabs 106 and 108 such that third securing tab 110 is located below first securing tab 106 and fourth securing tab 112 is located below second securing tab 108. The spaces between first and third securing tabs 106 and 110 and second and fourth securing tabs 108 and 112, respectively, receive the head or top portion of mounting fastener 72, as best seen in FIG. 6.

In addition, extension section 126 extends downwardly from ends 114 and 116 of first and second arms portions 94 and 96, respectively, thereby forming a generally obtuse angle with ends 114 and 116. Extension section 126 further includes first and second downwardly extending sections 128 and 130 forming a substantially shallow central groove 132 therebetween. First and second sections 128 and 130 are substantially shorter than extension section 126 with second section 130 being generally vertically aligned with upstanding section 124, as best seen in FIGS. 5 and 6.

It is preferable that extension section 118 and upstanding section 124 form a one piece unitary tab, and extension section 126 and first and second downwardly extending sections 128 and 130 also form a one-piece unitary tab.

Figure 7:
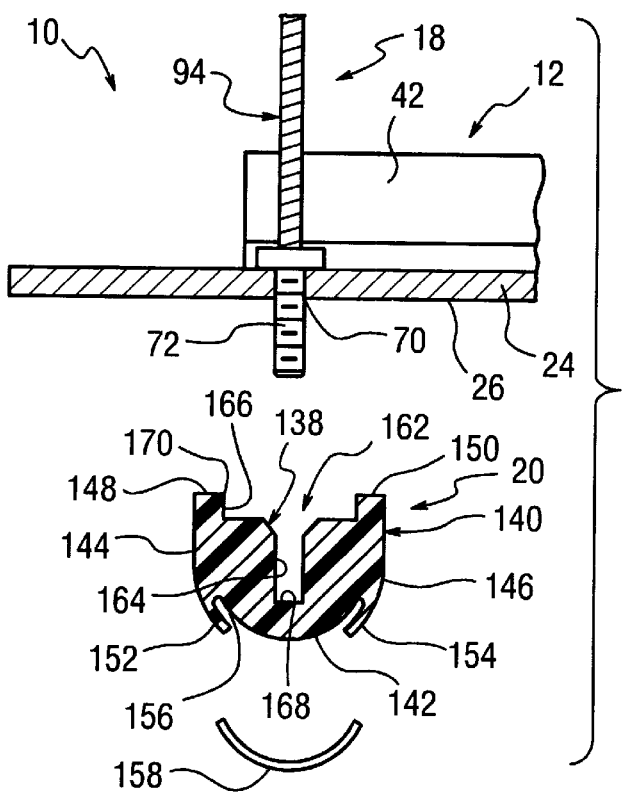
FIG. 7 is an enlarged, exploded, top view in section of the patch panel assembly taken along line 7—7 of FIG. 2, showing the assembly of the label cover, the patch panel, and the cable management bar.
Figure 8:
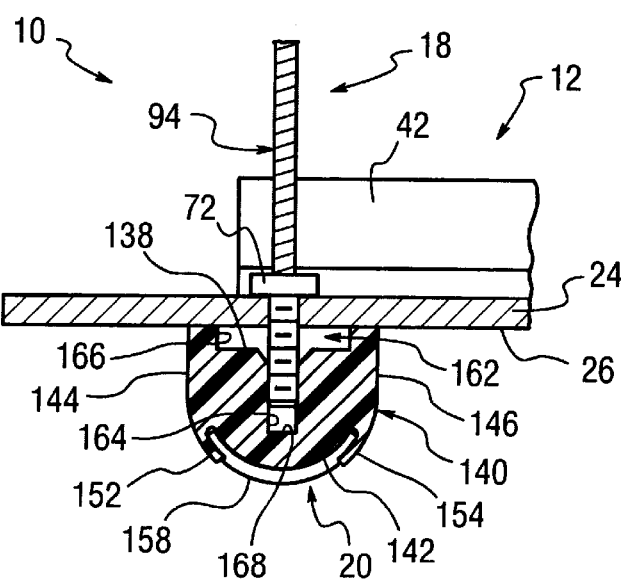
FIG. 8 is an enlarged, top view in section of the patch panel assembly illustrated in FIG. 7, showing the label cover, the patch panel, and the cable management bar assembled.
Figure 9:
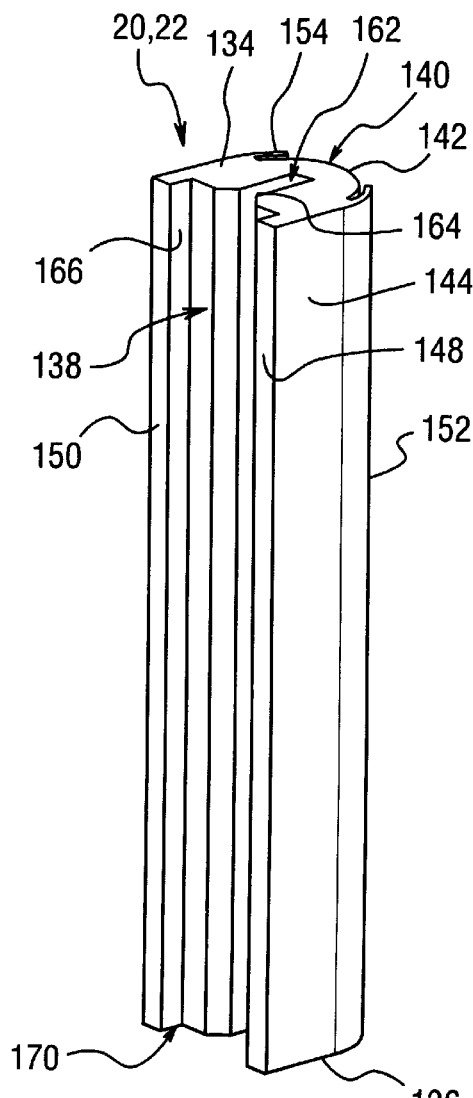
FIG. 9 is an enlarged, rear, side, perspective view of a label cover of the patch panel illustrated in FIG. 1.

First and second label covers 20 and 22 are disposed at first and second end portions 30 and 32 of panel 12, as seen in FIG. 1. Label covers 20 and 22 are substantially identical therefore the same reference numerals will be used to describe both. Each label cover 20 and 22 is a one piece unitary member preferably formed of a plastic material, having opposing first and second ends 134 and 136 and opposing inner and outer surfaces 138 and 140, as seen in FIG. 9. A length is defined between ends 134 and 136, which is slightly less than the height of panel 12 defined between upper and lower flanges 40 and 42. Outer surface 140 is substantially semi-cylindrical and forms a front curved wall 142, generally planar first and second side walls 144 and 146, and generally planar first and second rear end walls 148 and 150 that are substantially perpendicular to first and second side walls 144 and 146, respectively. Front wall 142, and side walls 144 and 146, and rear end walls 148 and 150 all extend between first and second ends 134 and 136. First and second curved extensions 152 and 154 also extend between ends 134 and 136 and extend from first and second sidewalls 144 and 146, respectively, in front of front wall 142 forming a space therebetween. The space between curved extensions 152 and 154 and front wall 142 forms a slot 156 for holding a label therein, as best seen in FIGS. 7 and 8, such that first label cover 20 has a first slot and second label cover 22 has a second slot. Slots 156 in particular allow a label 158 to be vertically inserted therein so that the back of label 158 abuts against front curved wall 142 and the front face of label 158 is displayed between curved extensions 152 and 154, as seen in FIGS. 7–9. Label 158 preferably includes identifying indicia 160 on its front face and is either paper alone or includes an adhesive backing.

Inner surface 138 of label covers 20 and 22 defines an inner receiving area 162 having first and second portions 164 and 166. First portion 164 is a generally rectangular slot with a planar end wall 168 and an open front providing access to second portion 166. First portion 164 preferably includes an inner threaded surface for mating with mounting fastener 72. Second portion 166 is also generally rectangular and is oriented at a substantially ninety degree angle to first portion 164 forming a generally T-shaped inner receiving area 162 such that the width of second portion 166 is substantially greater than the width of first portion 164, as best seen in FIG. 7. An access opening 170 to second portion 166 is defined between rear end walls 148 and 150 providing clearance for mounting fastener 72, and first and third tabs 106 and 110 or second and fourth tabs 108 and 112 of cable management bar 18 to be inserted into inner receiving area 162.

Assembly

As seen in FIGS. 1–9, to assemble patch panel assembly 10, adapter assembly 14 is mounted to patch panel 12 by placing first and second parts 74 and 76 of adapter assembly 14 adjacent rear surface 28 of panel 12 so that the plurality of jacks 78 on front surface 80 extend through the first and second pairs of openings 44 and 46 on panel 12, as best seen in FIG. 2. Fasteners 52 can then be inserted and tightened into first and second sets of fastener holes 48 and 50 in panel 12 and into the corresponding first and second group of fastener holes 84 and 86 in first and second parts 74 and 76 of adapter assembly 14.

Once adapter assembly 14 is secured to panel 12, cable management bar 18 can then be coupled to the rear of panel 12. Specifically, first and second securing tabs 106 and 108 extending from first and second arm portions 94 and 96 of bar 18, respectively, are inserted into first and second securing apertures 54 and 56 in panel 12, respectively. Bar 18 is rotated upwardly with respect to panel 12 so that upstanding sections 124 of first and second tabs 106 and 108 extend forwardly such that a vertical axis 172 of sections 124 is generally perpendicular to the plane of panel 12, thereby allowing upstanding sections 124 to be inserted into and extend through first and second securing apertures 54 and 56, respectively.

Bar 18 can then be rotated downwardly with respect to panel 12 so that third and fourth tabs 110 and 112 of first and second arm portions 94 and 96 of bar 18 can be inserted into third and fourth securing apertures 58 and 60 of panel 12. In particular, the height of first and second securing apertures 54 and 56 allows first and second tabs 106 and 108 to rotate therein until upstanding sections 124 extend through first and second securing apertures 54 and 56, respectively, with their vertical axes being parallel to the plane of panel 12, as best seen in FIGS. 5 and 6. Extension sections 118 of first and second tabs 106 and 108 remain disposed in first and second securing apertures 54 and 56, respectively, such that the lower surfaces 122 thereof rest on bottom surfaces 64 of first and second securing apertures 54 and 56 and the upper surfaces 120 of extension sections 118 are spaced from top surfaces 62 of first and second securing apertures 54 and 56, respectively.

Substantially simultaneously, third and fourth securing tabs 110 and 112 are inserted into third and fourth securing apertures 58 and 60 of panel 12, respectively. The height of third and fourth securing apertures 58 and 60, respectively, allows first downwardly extending sections 128 to be inserted through and clear apertures 58 and 60 so that central groove 132 engages bottom surfaces 68 of apertures 58 and 60 with the stop of sections 128 being spaced from top surfaces 66 of apertures 58 and 60, as best seen in FIG. 6.

As seen in FIG. 6, gravity keeps cable management bar 18 in place such that the lower surfaces 122 of upstanding sections 124 abut bottom surfaces 64 of apertures 54 and 56. Likewise, gravity maintains the engagement if central grooves 132 with bottom surfaces 68 of apertures 58 and 60. In addition, back edges 125 of upstanding sections 124 abut front surface 26 of panel 12, thereby preventing tabs 106 and 108 from coming out of apertures 54 and 56. Cable management bar 18 is now secured to panel 12 without the use of fasteners and can be easily removed, if desired, by reversing the steps described above. Wires 16 can then be attached to terminals 82 in the rear of adapter assembly 14.

After securing bar to panel 12, first and second label covers 20 and 22 can be mounted to the front of panel 12. However, label covers 20 and 22 can be mounted onto panel 12 as described below, prior to cable management bar 18 being secured to panel 12.

Specifically, label covers 20 and 22 are each placed over upwardly extending sections 124 of first and second tabs 106 and 108 and first downwardly extending sections 128 of third and fourth tabs 110 and 112 of bar 18 such that upwardly extending sections 124 and first downwardly extending sections 128 are received in first and second portions 164 and 166 of inner receiving area 162 in label covers 20, 22 with rear end walls 148 and 150 abutting front surface 26 of panel 12, as seen in FIG. 6 (showing only label cover 20). First and second label covers 20 and 22 thereby provide a cosmetic covering for upwardly extending sections 124 and first downwardly extending sections 128 once extended through panel 12. To secure first and second label covers 20 and 22 in place such that the length of covers 20 and 22 is substantially perpendicular to the length of panel 12, mounting fastener 72 is extended through mounting holes 70 in panel 12, as best seen in FIGS. 7 and 8. In particular, mounting fastener 72 is extended through rear surface 28 to front surface 26 of panel 12 and engages the inner threaded surface (not shown) of first portion 164 of inner receiving area 162. The space between first and third tabs 106 and 110, and second and fourth tabs 108 and 112, respectively, receive the top or head of fastener 72 such that fastener 72 is vertically aligned with tabs 106 and 110, and tabs 108 and 112, respectively. Labels 158 can then be inserted into slots 156 of first and second label covers 20 and 22 by sliding the label 158 from first end 134 to second end 136 and between curved extensions 152 and 154 and front curved wall 142, as best seen in FIG. 8 (showing only label cover 20), such that indicia 160 is displayed.

While a particular embodiment has been chosen to illustrate the invention, it will be understood by those skilled in the art that various changes and modifications can be made therein without departing from the scope of the invention as defined in the appended claims.

What is claimed is:

1. A patch panel assembly, comprising:

a panel having a main wall portion, opposing first and second surfaces, opposing first and second end portions with first and second panel securing apertures, respectively, and a first length defined between said first and second end portions, said first and second panel securing apertures extending from said first surface to said second surface; and a support member releasably coupled to said panel, said support member being a bar, and having a main portion, first and second arm portions extending from opposing ends of said main portion, and a second length defined between said opposing ends of said main portion, said second length being substantially equal to said first length of said panel, and said first and second arm portions including first and second support securing elements extending therefrom, respectively, said first and second support securing elements being received in and extending through said first and second panel securing apertures of said panel, respectively.

2. A patch panel assembly according to claim 1, wherein said panel includes third and fourth securing apertures on said first and second end portions, respectively.

3. A patch panel assembly according to claim 2, wherein said first and second arm portions of said support member include third and fourth support securing elements, respectively, received in said third and fourth securing apertures of said panel, respectively.

4. A patch panel assembly according to claim 3, wherein said first and second support securing elements are first and second tabs, respectively; and said third and fourth support securing elements are third and fourth tabs, respectively.

5. A patch panel assembly according to claim 4, wherein said first tab includes first and second sections, said first section extends outwardly from said first arm portion, and said second section extends upwardly from an end of said first section such that said second section is substantially perpendicular to said first section; and said second tab includes first and second sections, said first section of said second tab extends outwardly from said second arm portion, and said second section of said second tab extends upwardly from an end of said first section such that said second section is substantially perpendicular to said first section.

6. A patch panel assembly according to claim 4, wherein said third tab of said first arm portion includes first and second downwardly extending sections with a central groove therebetween that abuts a bottom surface of said third panel securing aperture; and said fourth tab of said second arm portion includes first and second downwardly extending sections with a central groove therebetween that abuts a bottom surface of said fourth panel securing aperture.

7. A patch panel assembly according to claim 6, wherein said main portion of said support member is oriented substantially parallel to said panel; and said first and second arm portions are substantially perpendicular to said main portion.

8. A patch panel assembly according to claim 7, further comprising an adapter assembly having a plurality of electrical connectors and being disposed on said second surface of said panel between said panel and said support member.

9. A patch panel assembly, comprising:

a panel having a main wall portion, a first surface, a second surface opposing said first surface, a first end portion with a first panel securing element, and a second end portion opposite said first end portion with a second panel securing element; and a first cover member coupled to said panel at said first end portion, said first cover member having a first end, a second end opposing said first end, an inner surface, and an outer surface opposing said inner surface, said inner surface substantially covering said first panel securing element, and said outer surface including a first slot for receiving a label.

10. A patch panel assembly according to claim 9, wherein a second cover member being attached to said first surface of said panel at said second end portion, said second cover member having a first end, a second end opposing said first end, an inner surface, and an outer surface opposing said inner surface, said inner surface substantially covering said second panel securing element, and said outer surface including a second slot for receiving a label.

11. A patch panel assembly according to claim 10, wherein said inner surface defining a receiving area extending from said first end to said second end for receiving a fastener, said receiving area having an access opening remote from said first slot.

12. A patch panel assembly according to claim 11, wherein said receiving area includes first and second portions with first and second widths, respectively, said first width being substantially smaller than said second width.

13. A patch panel assembly according to claim 12, wherein said first portion of said receiving area is centrally disposed in said first cover member and is substantially perpendicular to said second portion.

14. A patch panel assembly according to claim 13, wherein a fastener extends through said first end portion of said panel from said second surface to said first surface and engages said first portion of said receiving area thereby securing said first cover member to said first surface of said panel.

15. A patch panel assembly according to claim 11, wherein said outer surface of said first cover member is substantially semi-cylindrical.

16. A patch panel assembly according to claim 15, wherein said first slot is defined between first and second curved extensions extending from said outer surface.

17. A patch panel assembly according to claim 16, further comprising a label disposed in said first slot.

18. A patch panel assembly, comprising a panel having a main wall portion, opposing first and second surfaces, opposing first and second end portions with first and second panel securing elements, respectively;

a support member releasably coupled to said panel and having a main portion, and first and second arm portions extending from opposing ends of said main portion, with first and second support securing elements extending therefrom, respectively, said first and second support securing elements being engaged with said first and second panel securing elements of said panel, respectively; and a first cover member coupled to said panel at said first end portion, said first cover member having opposing inner and outer surfaces, said inner surface substantially covering both said first panel securing element and said first support securing element.

19. A relay rack assembly according to claim 18, further comprising a second cover member coupled to said panel at said second end portion, said second cover member having opposing inner and outer surfaces, said inner surface substantially covering both said second panel securing element and said second support securing element.

20. A relay rack assembly according to claim 19, wherein said outer surface of said first cover member includes a first slot for holding a first label; and said second cover member includes second slot for holding a second label.

21. A relay rack assembly according to claim 18, wherein each of said first and second panel securing elements are first and second apertures, respectively.

22. A relay rack assembly according to claim 21, wherein each of said first and second support securing elements are first and second tabs, respectively.

23. A relay rack assembly according to claim 22, wherein said panel member includes third and fourth panel securing elements; and said support member includes third and fourth support securing elements engaged with said third and fourth panel securing elements, respectively.

24. A relay rack assembly according to claim 23, wherein each of said third and fourth panel securing elements is a third and fourth securing aperture, respectively; and each of said third and fourth support securing elements is a third and fourth tab, respectively.

25. A relay rack assembly according to claim 24, wherein said first cover member substantially covers said first and third apertures of said panel and said first and third tabs of said support member; and said second cover member substantially cover said second fourth apertures and said second and fourth tabs of said support member.

26. A patch panel assembly, comprising:

a panel having a main wall portion, opposing first and second surfaces, and opposing first and second end portions with first and second panel securing apertures, respectively, said first and second panel securing apertures extending from said first surface to said second surface; and a support member releasably coupled to said panel and having a main portion, and first and second arm portions extending from opposing ends of said main portion, said first and second arm portions including first and second support securing elements extending therefrom, respectively, said first and second support securing elements being received in and extending through said first and second panel securing apertures of said panel, respectively, and first support securing element being a first tab with first and second sections, said first section being axially aligned with and extending outwardly from said first arm portion, and said second section extending away from said first arm portion so that said second section is substantially perpendicular to said first section.

27. A patch panel assembly according to claim 26, wherein said second support securing element being a second tab with first and second sections, said first section being axially aligned with and extending outwardly from said second arm portion, and said second section extending away from said second arm portion so that said second section is substantially perpendicular to said first section.

28. A patch panel assembly according to claim 26, wherein said panel includes third and fourth securing apertures on said first and second end portions, respectively.

29. A patch panel assembly according to claim 28, wherein said first and second arm portions of said support member include third and fourth support securing elements, respectively, received in said third and fourth securing apertures of said panel, respectively.

30. A patch panel assembly according to claim 29, wherein said third and fourth support securing elements are third and fourth tabs, respectively, each of said third and fourth tabs includes first and second sections extending in a direction opposite said second sections of each said first and second tabs.

31. A patch panel assembly according to claim 26, wherein said support member is a unitary one piece member.

* * * * *